United States Patent
Yahata

(10) Patent No.: US 9,066,034 B2
(45) Date of Patent: Jun. 23, 2015

(54) IMAGE PROCESSING APPARATUS, METHOD AND PROGRAM WITH DIFFERENT PIXEL APERTURE CHARACTERISTICS

(75) Inventor: Kazuhiro Yahata, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 13/479,978

(22) Filed: May 24, 2012

(65) Prior Publication Data

US 2012/0307099 A1     Dec. 6, 2012

(30) Foreign Application Priority Data

May 30, 2011   (JP) ................................ 2011-119945

(51) Int. Cl.
| | | |
|---|---|---|
| H04N 5/369 | (2011.01) | |
| H04N 13/02 | (2006.01) | |
| G06T 1/00 | (2006.01) | |
| G06T 5/50 | (2006.01) | |
| H04N 13/00 | (2006.01) | |

(52) U.S. Cl.
CPC .......... H04N 5/3696 (2013.01); H04N 13/0232 (2013.01); *H04N 2013/0088* (2013.01); G06T 5/50 (2013.01); *G06T 2200/21* (2013.01); *G06T 2207/10052* (2013.01); G06T 1/0007 (2013.01)

(58) Field of Classification Search
None
See application file for complete search history.

(56) References Cited

U.S. PATENT DOCUMENTS

| 6,023,535 | A | 2/2000 | Aoki | |
|---|---|---|---|---|
| 8,228,417 | B1* | 7/2012 | Georgiev et al. ............... | 348/340 |
| 2007/0035653 | A1* | 2/2007 | Hong et al. .................... | 348/340 |
| 2007/0187574 | A1* | 8/2007 | Lia ............................... | 250/208.1 |
| 2008/0123983 | A1* | 5/2008 | Xiong et al. ................... | 382/249 |
| 2009/0303377 | A1* | 12/2009 | Meisenzahl ................... | 348/340 |
| 2009/0316014 | A1* | 12/2009 | Lim et al. ...................... | 348/222.1 |
| 2011/0064327 | A1* | 3/2011 | Dagher et al. ................ | 382/263 |
| 2012/0069235 | A1* | 3/2012 | Imai ........................... | 348/333.11 |
| 2012/0189293 | A1* | 7/2012 | Cao et al. ...................... | 396/333 |
| 2012/0249819 | A1* | 10/2012 | Imai ............................ | 348/222.1 |
| 2013/0002928 | A1* | 1/2013 | Imai ........................... | 348/333.11 |

FOREIGN PATENT DOCUMENTS

| JP | 2004-056516 A | 2/2004 |
|---|---|---|
| JP | 3773563 A | 5/2006 |
| JP | 3844718 A | 11/2006 |

(Continued)

OTHER PUBLICATIONS

Saito et al., "An Image Processing Algorithm for a Super High Definition Imaging Scheme With Multiple Different Aperture Cameras," IEEE International Conference on Acoustics, Speech, and Signal Processing, ICASSP-94, 1994.*

(Continued)

*Primary Examiner* — Dennis Hogue
(74) *Attorney, Agent, or Firm* — Fitzpatrick, Cella, Harper & Scinto

(57) ABSTRACT

When the super-resolution processing is performed, loss of signal occurs due to the aperture effect, and adversely affects the image quality. In order to improve the image quality by suppressing the occurrence of loss of signal, a pixel aperture characteristic provided for some of image capturing units differs from a pixel aperture characteristic provided for the other image capturing units, and a plurality of digital images are captured by these image capturing units and are synthesized thereafter.

12 Claims, 11 Drawing Sheets

(56) References Cited

FOREIGN PATENT DOCUMENTS

| | | | |
|---|---|---|---|
| JP | 3907729 | A | 4/2007 |
| JP | 2010-141381 | A | 6/2010 |
| JP | 4654887 | A | 3/2011 |

OTHER PUBLICATIONS

Komatsu et al., "Signal-processing based method for acquiring very high resolution images with multiple cameras and its theoretical analysis," IEE Proceedings-I, vol. 140, No. 1, Feb. 1993.*

A. Isaksen, et al., "Dynamically Reparameterized Light Fields", ACM SIGGRAPH, 2000, p. 297-306.

S.C. Park, et al., "Super-Resolution Image Reconstruction: A Technical Overview", IEEE Signal Proc. Magazine, vol. 26, No. 3, May 2003, pp. 21-36.

R. Ng, et al., "Light Field Photography with a Hand-Held Plenoptic Camera", Stanford University Computer Science Tech Report CSTR 2005-02.

T. Komatsu et al., "Very High Definition Image Acquisition Method Using Multiple Cameras with Different Pixel Apertures", ITE Technical Report, vol. 17, No. 29, pp. 13-18 (1993).

* cited by examiner

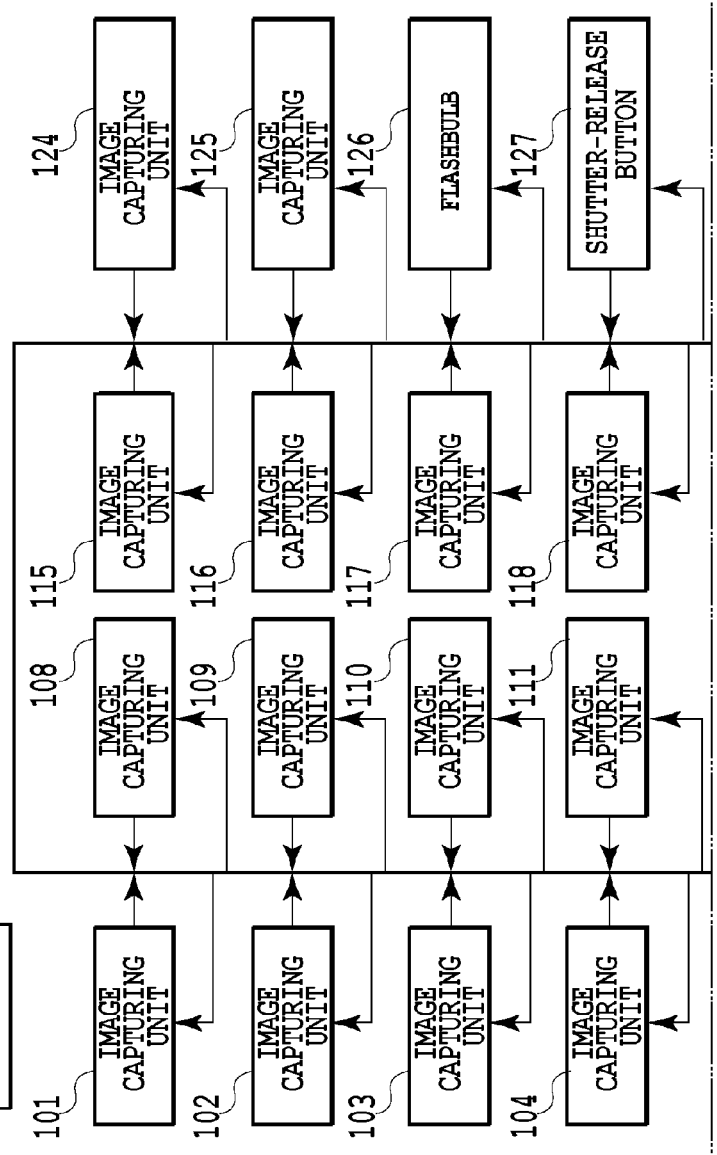

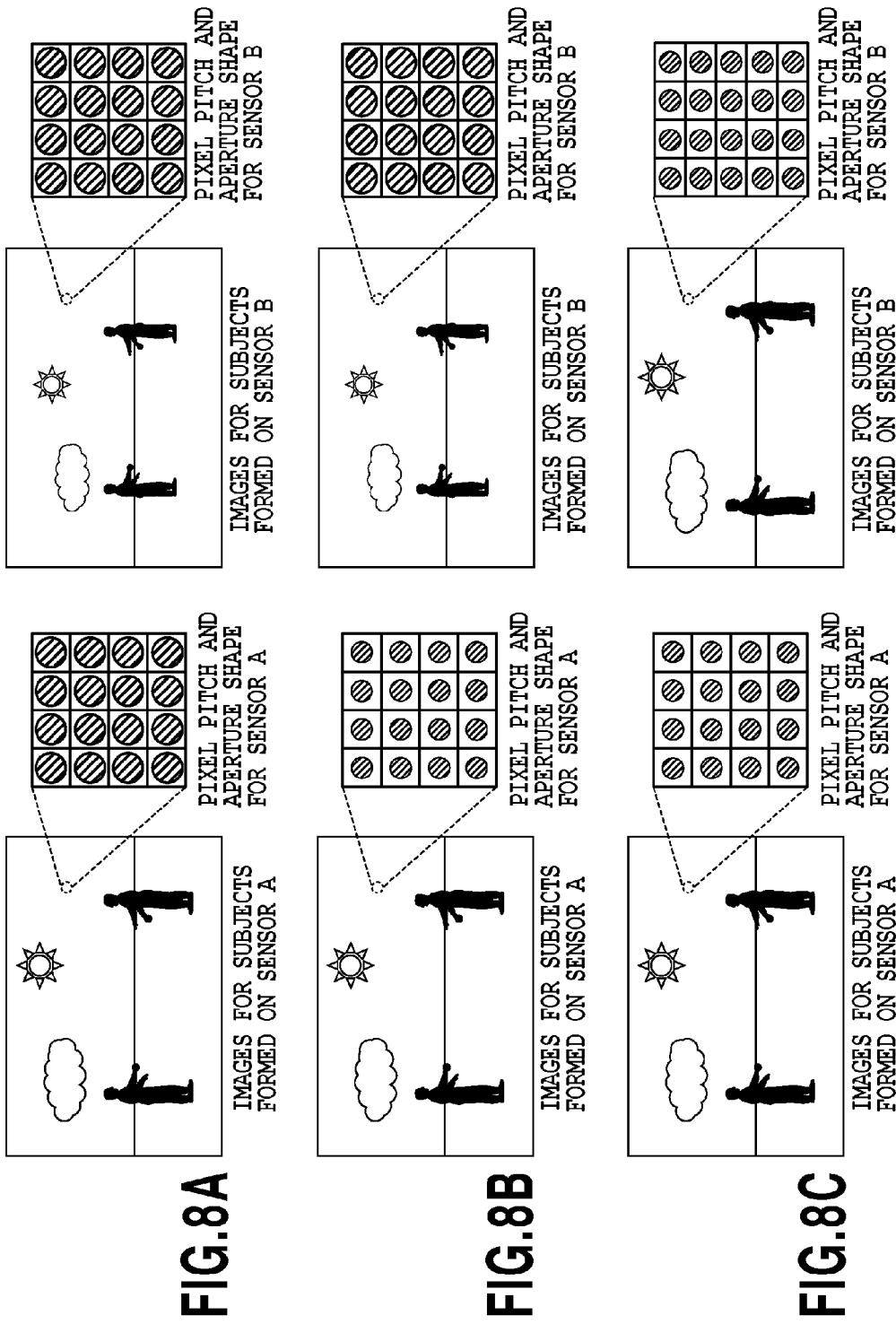

IMAGE PROCESSING APPARATUS, METHOD AND PROGRAM WITH DIFFERENT PIXEL APERTURE CHARACTERISTICS

BACKGROUND OF THE INVENTION

1. Field of the Invention

The present invention relates to an image processing apparatus for employing image data obtained by a plurality of image capturing units, and an image processing method therefor.

2. Description of the Related Art

An image processing apparatus and an image processing method have been proposed whereby a focal length and a diaphragm can be altered after an image has been captured. As an example, disclosed in "Light Field Photography with a Hand-Held Plenoptic Camera", R. Ng, M. Levoy, et al. , Stanford University Computer Science Tech Report CSTR 2005-02, are the configuration of a plenoptic camera that records the status of light fields inside an optical image capturing system, and a development method for subsequently altering a focal length (hereinafter referred to as "refocusing") . Further, in "Dynamically Reparameterized Light Fields", Isaksen et al., ACM SIGGRAPH, pp. 297-306 (2000), a method is disclosed whereby a camera array, which includes a plurality of small image capturing units having large depths of field, is employed to capture images, and based on these images, an image with a small or narrow depth of field is generated (hereinafter, this method is referred to as "controlling of the depth of field"). Generally, for a camera array provided by arranging multiple small cameras, the number of pixels for each camera is small and the resolution is low because of the camera size. Furthermore, compared with an ordinary camera that has the same number of pixels, a plenoptic camera has a low resolution.

A known method for increasing resolution is the super-resolution processing in which a plurality of low-resolution images, where a pixel shift has occurred, are synthesized to generate a high-resolution image (e.g., "Super-Resolution Image Reconstruction: A Technical Overview", S. C. Park, M. K. Park and M. G. Kang, IEEE Signal Proc. Magazine, Vol. 26, 3, P. 21-36 (2003), and Japanese Patent No. 4654887 and No. 3907729). Furthermore, in a "Very High Definition Image Acquisition Method using Multiple Cameras with Different Pixel Apertures", Takashi Komatsu, Kiyoharu Aizawa and Takahiro Saito, ITE Technical Report, Vol. 17, No. 29, pp. 13-18 (1993), a method is disclosed for changing pixel pitches to effectively obtain images where pixel shifts have occurred, which are required for super-resolution processing.

When an image for a subject that includes a high-frequency component is formed on an image capturing sensor, and sampling is performed for the image using a frequency lower than that for the high-frequency component, the high-frequency component is mixed with the low-frequency component. As a result, so-called folding noise (or aliasing) occurs. The super-resolution processing, which uses a plurality of images where there is a pixel shift, is a process for separating the mixed high-frequency component and recovering an image signal. It should be noted that, generally, a signal recovered at this time is degraded, compared with one that is for an image formed on the image capturing sensor. This occurs because pixel apertures for the individual pixels of the image capturing sensor have finite sizes in order to collect much light.

A phenomenon, where a signal is degraded because the pixel apertures (hereinafter referred to simply as apertures) have finite sizes, is called the aperture effect. As will be later described in detail, the influence of the aperture effect is very strong, depending on a frequency, and may cause the original signal to be attenuated, and buried in noise. For example, in a typical case wherein the aperture is nearly as large as the pixel, a frequency that is about twice the Nyquist frequency is greatly attenuated by the aperture effect. There are also some other frequencies that are greatly attenuated. When the super-resolution processing is performed to recover the high-frequency component of a signal that is attenuated, the attenuated signal is buried in noise and, in actuality, is lost, and therefore, a high quality, high resolution image can not be obtained.

SUMMARY OF THE INVENTION

An image processing apparatus comprising: an input unit configured to input a plurality of digital image data obtained by a plurality of image capturing units, wherein a pixel aperture characteristic provided for at least some of the image capturing units differs from a pixel aperture characteristic provided for the other image capturing units; an obtaining unit configured to obtain design parameters including the pixel aperture characteristics for the plurality of image capturing units; and a generation unit configured to synthesize the plurality of digital image data input by the input unit using the obtained designed parameters to generate developed image data, wherein the developed image data represents an image consisting of a greater number of pixels than each image represented by the digital image data obtained by the each image capturing unit.

According to the present invention, loss of signal due to the aperture effect is suppressed, and a high-resolution image with an image quality higher than a conventional image is generated.

Further features of the present invention will become apparent from the following description of exemplary embodiments (with reference to the attached drawings).

BRIEF DESCRIPTION OF THE DRAWINGS

FIG. 2 is a diagram showing the relationship of FIGS. 2A and 2B;

FIGS. 2A and 2B are block diagrams illustrating an example arrangement for the image capturing apparatus according to the embodiment of the present invention;

FIGS. 8A to 8C are diagrams showing examples for explaining the embodiment of the present invention, for a case wherein the aperture characteristics can be changed, and for a case wherein the aperture characteristics can not be changed;

DESCRIPTION OF THE EMBODIMENTS

<General Arrangement of Image Processing Apparatus>

Figure 1:
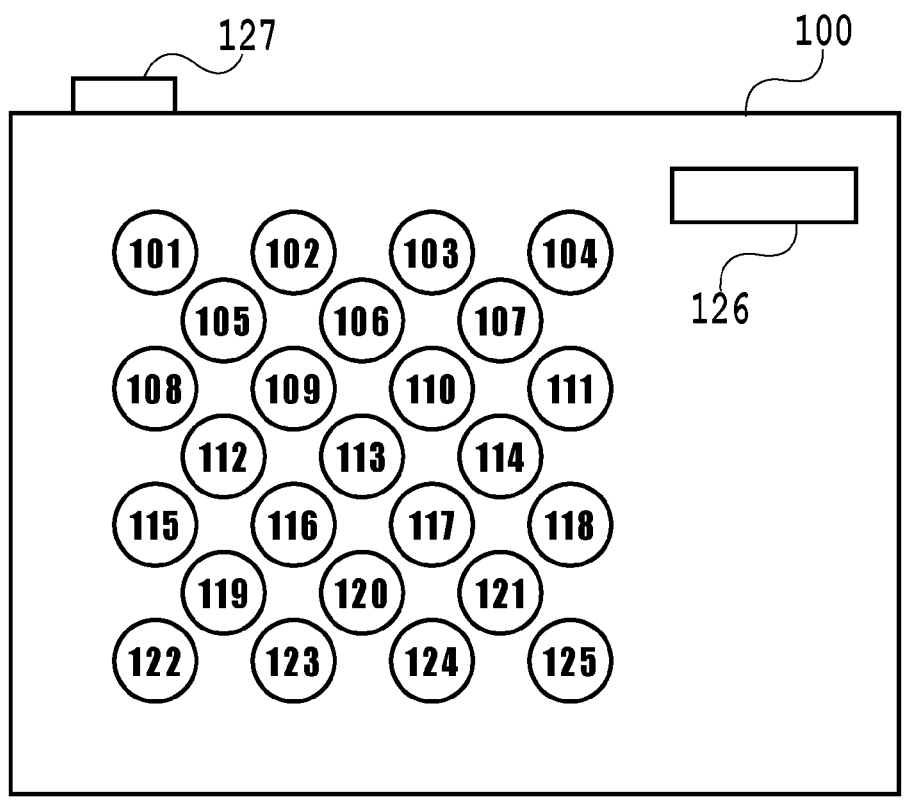
FIG. 1 is a diagram illustrating an example external appearance of an image capturing apparatus according to one embodiment of the present invention.

FIG. 1 is a diagram illustrating a general view of an image capturing apparatus (image processing apparatus) 100 according to one embodiment of the present invention. The image capturing apparatus 100 is a so-called camera array (also known as a camera array system, a multiple lens camera or the like) where 25 image capturing units 101 to 125 are provided on the front face (on the side nearest a subject). The image capturing unit 100 also includes a flash bulb 126 and a shutter-release button 127, and further includes, although not shown in FIG. 1, an operating unit and a display unit on the rear face.

The number of image capturing units is not limited to 25, and an arbitrary number of image capturing units, more than one, may be provided. Further, a plurality of image capturing units are not necessarily arranged on the same face, and can be arbitrarily arranged so long as the same subject, or substantially the same region, can be captured at almost the same time by these image capturing units. Here, "substantially the same region" refers, for example, to a region lying within a range such that an image, for the subject, can be reconstructed by performing super-resolution processing, which will be described later, and "almost at the same time" refers, for example, to a time difference, the length of which is not so great that image reconstruction by the super-resolution processing for a subject will not be affected.

Figure 2B:
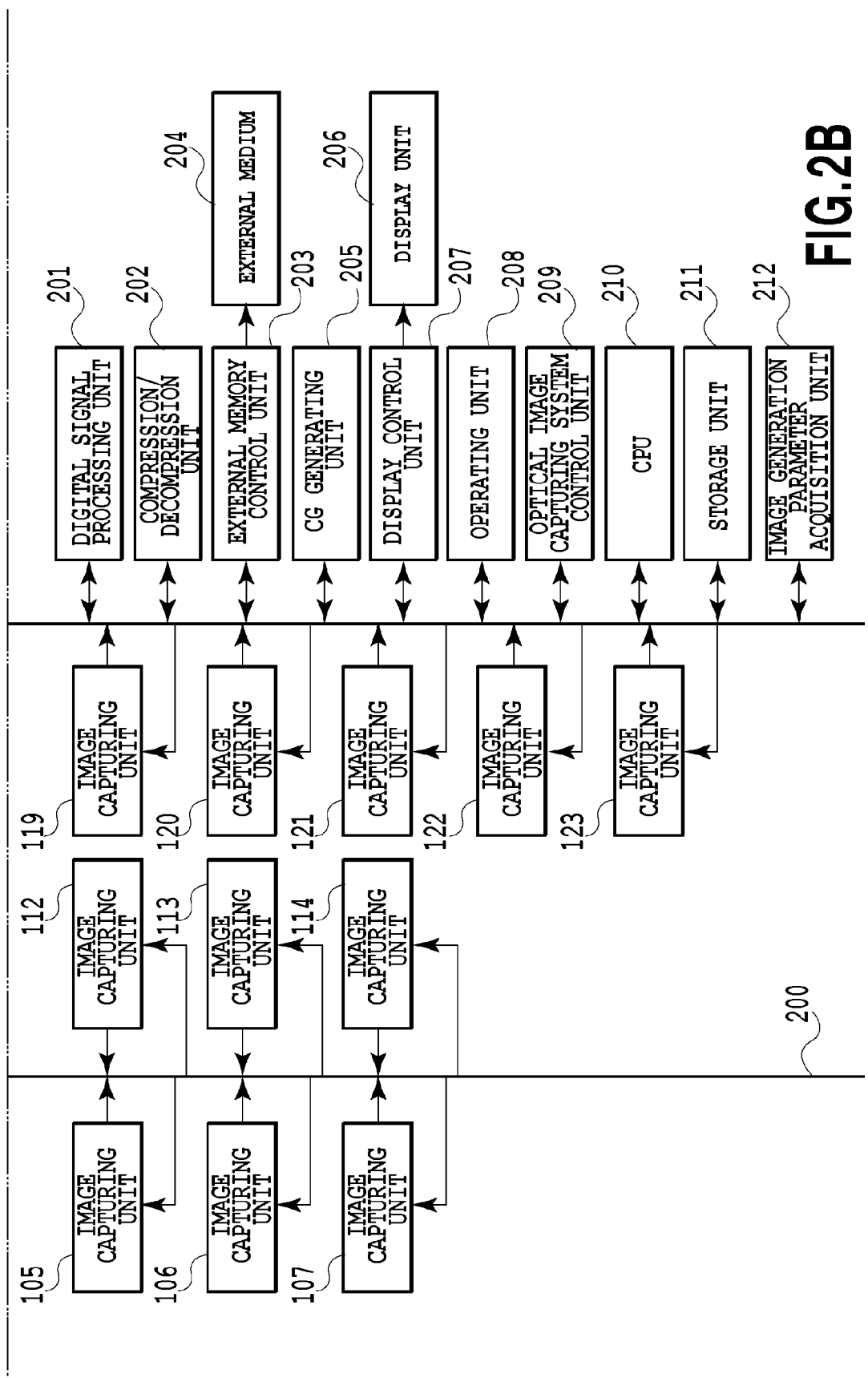

An example arrangement for the image capturing apparatus 100 will now be described while referring to the block diagrams in FIGS. 2A and 2B. In FIGS. 2A and 2B, a system bus 200 is a channel for the transfer of data. Image capturing units 101 to 125 obtain, from individual image capturing sensors, optical data for a subject to perform an A/D conversion for the optical data, and thereafter output the thus obtained digital data (hereinafter referred to as "RAW data") to the system bus 200. A detailed description of the image capturing units 101 to 125 will be given later. A flash bulb 126 projects light onto the subject.

A digital signal processing unit 201 performs various processes for a plurality of RAW data sets output by the image capturing units 101 to 125, and generates digital image data. These various processes specifically include a process for synthesizing (a super-resolution process) a plurality of RAW data sets, a demosaicing process, a white balancing process, a gamma correction process and a noise reduction process. The digital signal processing unit 201 also adds, to the digital image data, the following values and parameters: image capturing parameters such as those for zooming, focusing, a diaphragm and an exposure period, which are set for the image capturing units 101 to 125 at the image capturing time; camera design parameters such as relative positions of the image capturing units 101 to 125, pixel pitches of image capturing sensors internally provided for the individual image capturing units 101 to 125, and the shape for pixel apertures; and image generation parameters such as a focal length and a depth of field required for a refocusing process, which are adjusted by a user in order to generate image data.

A compression/decompression unit 202 performs a process for converting the digital image data into an image file format, such as a JPEG format or an MPEG format. An external memory control unit 203 is an interface that connects the image capturing apparatus 100 to an external medium 204, which is, for example, a hard disk, a memory card, a CF card, an SD card or a USB memory. A CG generating unit 205 generates a GUI composed of characters and graphics, and synthesizes the GUI with digital image data generated by the digital signal processing unit 201 to create new digital image data.

A display unit 206 presents for a user various types of information, such as a setting for the image capturing apparatus 100 and captured images. A display control unit 207 displays on the display unit 206 a digital image represented by the digital image data that have been received from the CG generating unit 205 or the digital signal processing unit 201. An operating unit 208 corresponds to a button or a mode dial, and generally includes a plurality of buttons and a mode dial. Further, the display unit 206 maybe a touch panel and may also serve as an operating unit. Users' instructions are entered via the operating unit 208.

An optical image capturing system control unit 209 controls an optical image capturing system, e.g., adjusts focus, presses/releases a shutter, or adjusts a diaphragm. Further, the optical image capturing system control unit 209 outputs signals indicating the states of the image capturing units 101 to 125, such as the focal length setting or the zoom value setting designated by controlling the optical system, i.e., outputs signals indicating image capturing parameters.

A CPU 210 performs various processes based on user instructions. A storage unit 211 stores instructions executed by the CPU 210, image capturing parameters output by the optical image capturing system control unit 209, and camera design parameters and the like. An image generation parameter obtaining unit 212 obtains image generation parameters required by the digital signal processing unit 201 to generate image data.

The image capturing units 101 to 125 will now be described in detail while referring to FIG. 3. A focusing lens group 301 moves forward and backward along the optical axis to adjust a focal point on a lens field of view. A zoom lens group 302 moves forward and backward along the optical axis to change the focal lengths of the image capturing units 101 to 125. A diaphragm 303 adjusts the amount of light received from a subject. A fixed lens group 304 is a group of lenses used to improve lens performance, such as lens telecentric performance. A shutter 305 blocks passing the amount of light originating at a subject. An IR cut-off filter 306 absorbs the infrared rays received from the subject, and a color filter 307 allows only light in a specific wavelength range to pass. Image capturing sensors 308, such as CMOS sensors and CCD sensors, convert the amount of light received from the subject into analog signals. An A/D converter 309 converts the analog signals generated by the image capturing sensors 308 into digital signals (RAW data). The RAW data, output by the A/D converter 309, are temporarily stored in a buffer 310, and in accordance with a request issued by the CPU 210, the RAW data are transmitted to the storage unit 211 via the system bus 200.

Figure 3:
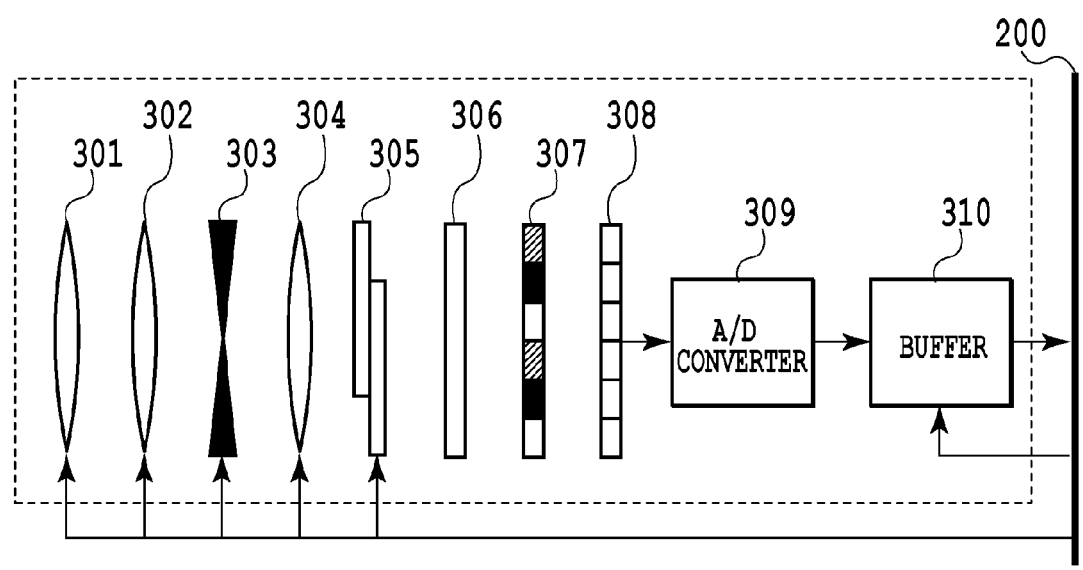
FIG. 3 is a detailed block diagram illustrating an example arrangement for an image capturing unit according to the embodiment of the present invention.

The arrangement shown in FIG. 3 for the focusing lens group 301, the zoom lens group 302, the diaphragm 303 and the fixed lens group 304 is merely an example, and other arrangements may also be employed, i.e., this embodiment is not limited to the employment of a single arrangement. The image capturing units 101 to 125 have been described in some detail, but although a general description has been given for the image capturing units 101 to 125, in this embodiment not all these image capturing units 101 to 125 employ precisely the same structure in order to control the aperture effect. Specifically, the structure employed for the individual image capturing units 101 to 125 is the one; that the shapes of pixel apertures differ; or that in the event the aperture shapes are the same, the focal length and imaging magnification differ; or that both the aperture shape and the imaging magnification differ and the relative sizes of the image of a subject and the aperture shape are not identical among the image capturing units. As will be described later, the aperture shape and the imaging magnification for a subject need not be different in all of the image capturing units. That is, the same aperture shape or the same imaging magnification may be provided for some of the image capturing units. In other words, a specific aperture shape or a specific magnification may be provided for at least some of image capturing units, and an aperture shape or a magnification that differ from those are provided for the remaining image capturing units. This pixel aperture shape or the magnification for a subject is generally called a pixel aperture characteristic.

There are other constituents of the image capturing apparatus; however, since those components are not the primary objects for this embodiment, no explanation for them will be given.

<Process flow for Image Capturing>

Figure 4:
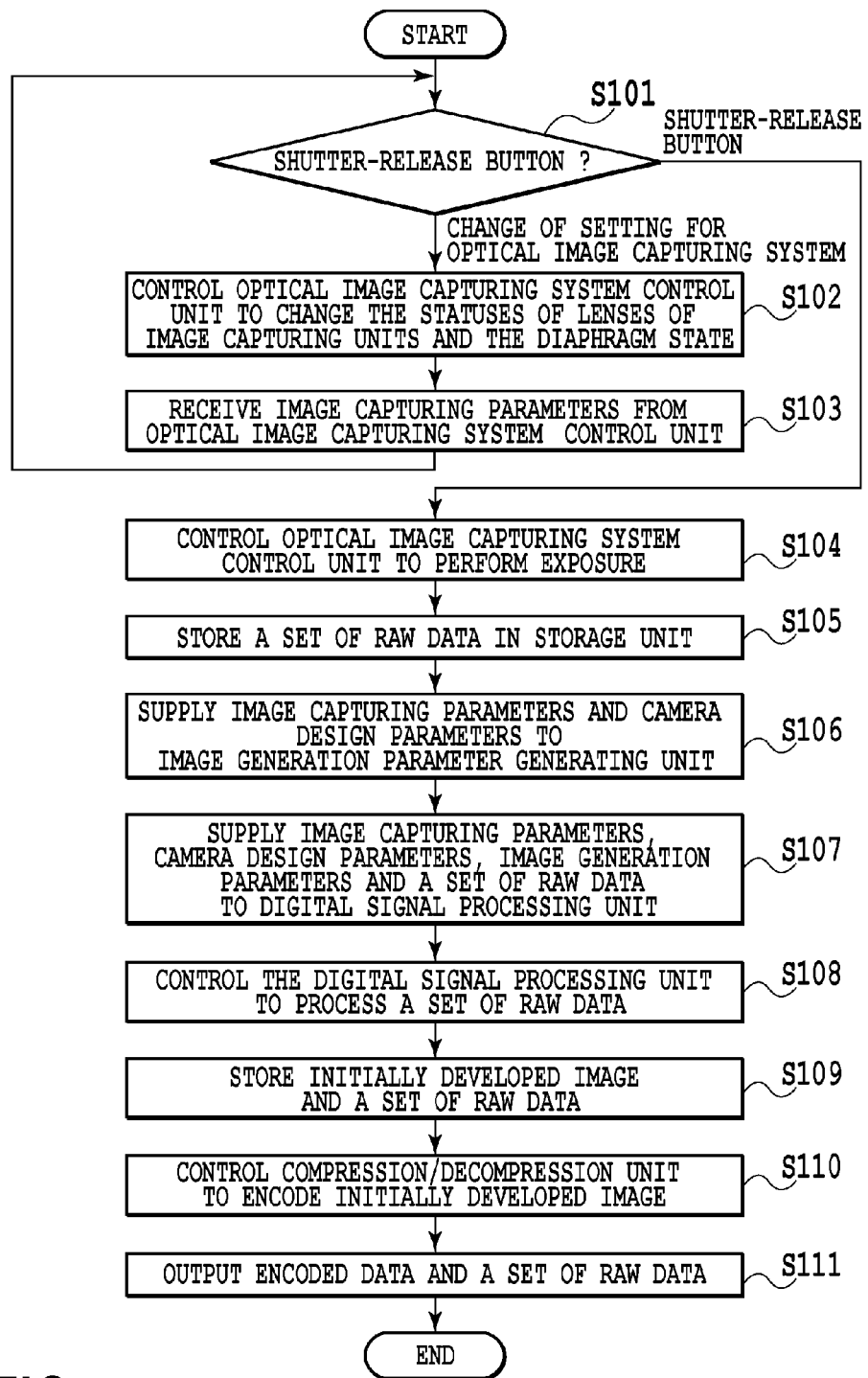
FIG. 4 is a flowchart showing an example image capturing operation performed by the image capturing apparatus according to the embodiment of the present invention.

An example image capturing operation performed by the image capturing apparatus of this embodiment will now be described while referring to the flowchart in FIG. 4. The processing shown in FIG. 4 is initiated after the CPU 210 has read and interpreted a program stored in the storage unit 211.

When a user enters an appropriate instruction through the operating unit 208, an image capturing operation is begun. The CPU 210, upon receiving the user instruction via the operating unit 208, determines the intent of this user operation (S101). When the user change the settings of the optical image capturing system, such as the zoom, focus and diaphragm controls, the CPU 210 controls the optical image capturing system control unit 209 to change the states of all the lens groups of the image capturing units 101 to 125, and the state of the diaphragm (S102). Subsequently, the optical image capturing system control unit 209 transmits, to the CPU 210, image capturing parameters indicating the states of the lens groups of the image capturing units 101 to 125 and the state of the diaphragm. Then, the CPU 210 stores the received image capturing parameters in a predetermined area of the storage unit 211 (S103). When the user pushes the shutter release button 127, the CPU 210 operates the optical image capturing system control unit 209, which opens the shutters 305 of the image capturing units 101 to 125 for a predesignated period of time to expose the image capturing sensor 308 to light (S104). Thereafter, the optical image capturing system control unit 209 accesses the buffers 310 of the image capturing units 101 to 125, and stores a set of RAW data in a predetermined area of the storage unit 211 (S105).

Next, the CPU 210 reads the image capturing parameters and the camera design parameters from the storage unit 211, and supplies these parameters to the image generation parameter obtaining unit 212 (S106). The image generation parameter obtaining unit 212 generates and obtains image generation parameters from the supplied image capturing parameters and camera design parameters. As previously described, the image generation parameters are those parameters, such as focal length and depth of field for refocusing, that a user can adjust. When the image generation parameter generation process is to be performed immediately after the image capturing process, for example, the focal length may be set in accordance with focusing data included in the image capturing parameters, and the depth of field may be set to a value that is the smallest within a range that a user can adjust. The CPU 210 then receives the image generation parameters obtained by the image generation parameter obtaining unit 212, and thereafter, transmits the image generation parameters, the image capturing parameters, the camera design parameters and the RAW data sets to the digital signal processing unit 201 (S107).

The CPU 210 controls the digital signal processing unit 201. The digital signal processing unit 201 initiates a process for developing the RAW data sets (S108). The digital signal processing unit 201 performs the image generation processing based on the supplied image generation parameters, the image capturing parameters, the camera design parameters and the RAW data sets, and creates digital image data. The digital image data thus generated by the digital signal processing unit 201 is called developed image data. Further, the first developed image data generated at S108 is called the initially developed image data. Of the image generation processing, a synthesis process for a plurality of RAW data sets will be described later. Of the image generation processing, a demosaicing process, a white balancing process, a gamma correction process and a noise reduction process can be performed by employing conventional techniques, and are not the primary objects of this embodiment, and therefore, no further explanation for these processes will be given.

The digital signal processing unit 201 additionally provides the image capturing parameters and the camera design parameters for the initially developed image data and the RAW data, respectively, and provides the image generation parameters for the initially developed image data. Then, the digital signal processing unit 201 stores the initially developed image data in a predetermined area of the storage unit 211 (S109).

Next, the CPU 210 controls the compression/decompression unit 202. The compression/decompression unit 202 encodes the initially developed image data (S110). Since the encoding process may be performed by a conventional technique, and is not the primary subject of this embodiment, no explanation for this process will be given. Thereafter, the external memory control unit 203 writes, to the external medium 204, the data encoded by the compression/decompression unit 202 and the RAW data sets (S111). The image capturing processing is thereafter terminated.

<Flow Processing for Image Data Redevelopment Following Image Capturing>

In this embodiment, after an image has been captured, a user can change the image generation parameters and redevelop image data for the purpose of refocusing or controlling the depth of field. Since this processing is not the primary object of this embodiment, the processing will only briefly be explained. It is preferable that the processing be begun upon the reception of a user's instruction entered at the operating unit 208; however, the processing may also be begun automatically after image capturing has been performed.

First, upon receiving a signal from the operating unit 208, the CPU 210 exercises control of the compression/decompression unit 202. The compression/decompression unit 202 reads the encoded data from the external medium 204, for example, and decodes the data to generate the initially developed image data. Then, the CPU 210 reads the image capturing parameters, the camera design parameters and the image generation parameters that are additionally provided for the initially developed image data. Consecutively, the CPU 210 controls the CG generating unit 205. The CG generating unit 205 generates a GUI that is required to change the image generation parameters. For GUI generation, the initially developed image data received from the CPU 210 and various other parameters are employed. Thereafter, the display control unit 207 displays, on the display unit 206, the GUI generated by the CG generating unit 205.

The user then inspects an image on the display unit 206 that represents the initially developed image data, and when the user desires to change the image, changes the image generation parameters through the operating unit 208. Thereafter, based on image generation parameters selected by the user, the digital signal processing unit 201 performs the image generation processing. The generated developed image data is transmitted to the CG generating unit 205, whereby a GUI is generated, and the redevelopment results are provided for the user on the display unit 206.

So long as issuing of an instruction for changing the image generation parameters is continued, the above described processing is repeated. When the new parameters have been established, the image data that have been developed are encoded and stored in the external medium 204, in the same manner as for the image data that is initially developed. This completes the brief description of the redevelopment processing.

<Principle of Controlling the Aperture Effect>

Before the synthesis process for a plurality of RAW data sets is described, the principle employed in this embodiment to suppress deterioration of an image quality due to the aperture effect will now be described.

Figure 5:
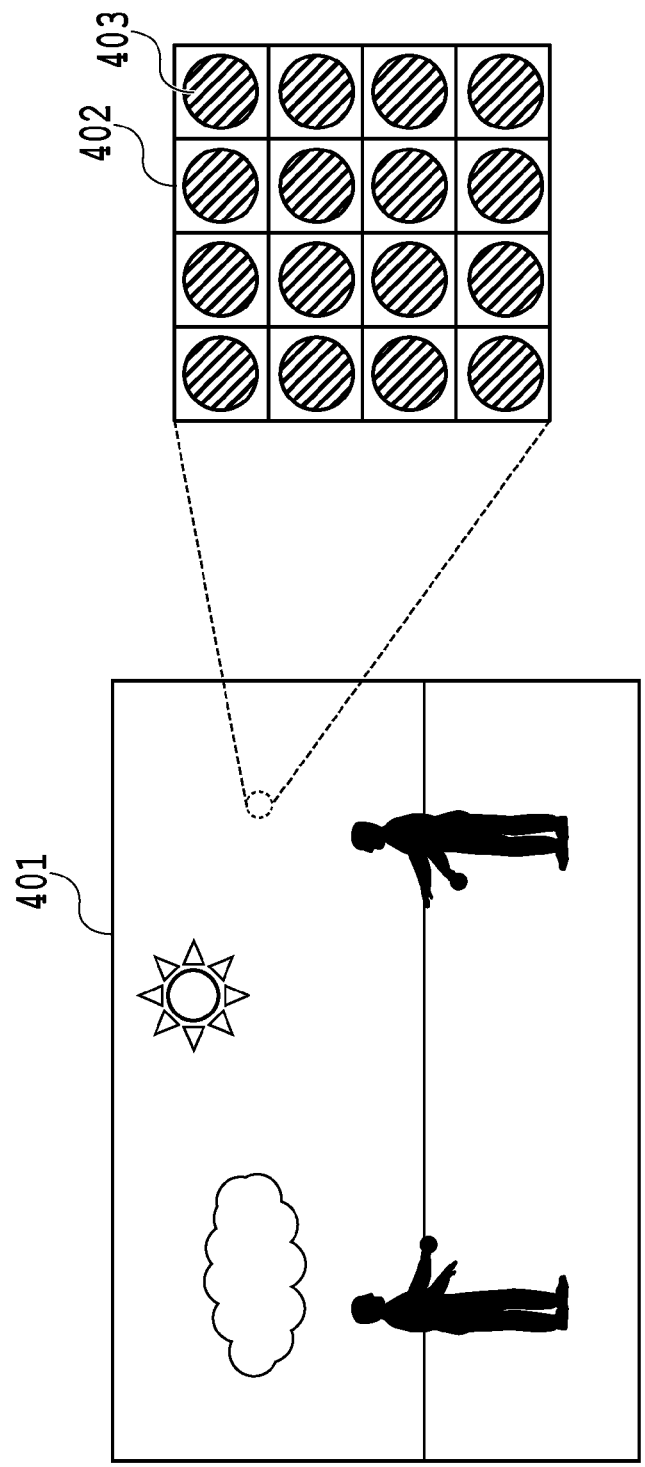
FIG. 5 is a schematic diagram showing an example image capturing sensor.

First, based on a schematic view of an image capturing sensor as shown in FIG. 5, the image of a subject is formed on the surface of an image capturing sensor 401. Referring to an example in FIG. 5, 16 pixels 402 are extracted from those arranged in the image capturing sensor 401 and are enlarged. Here, pixel apertures 403 are the portions of pixels where light from the subject can be received.

Figure 6A:
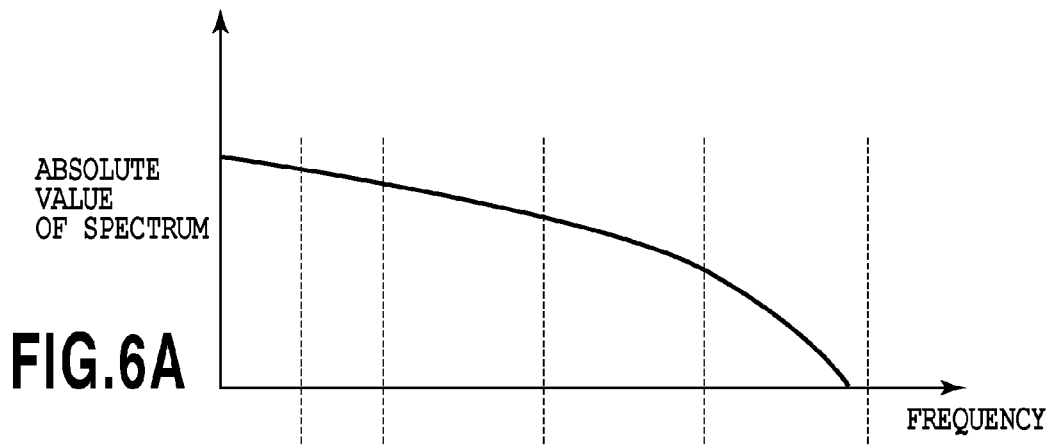
FIGS. 6A to 6C are conceptual diagrams showing example spectra for images that have been captured.
Figure 6B:
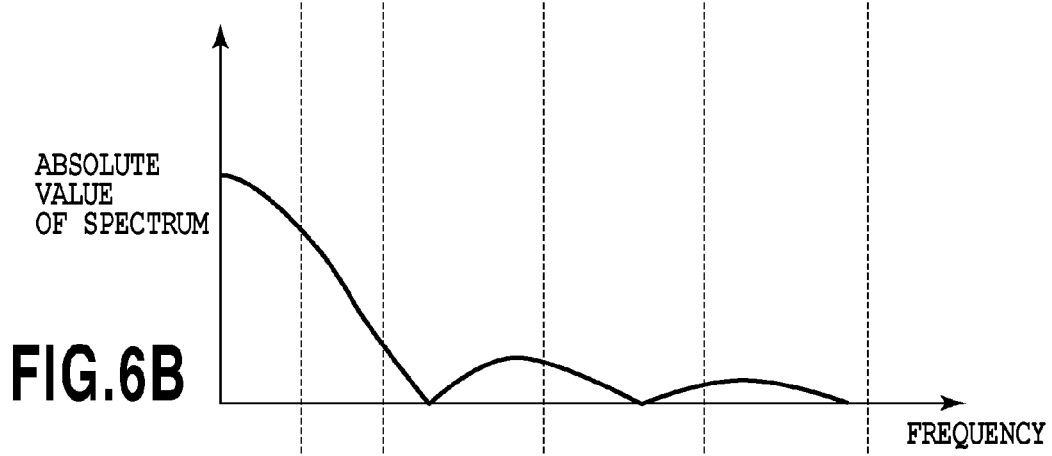
Figure 6C:
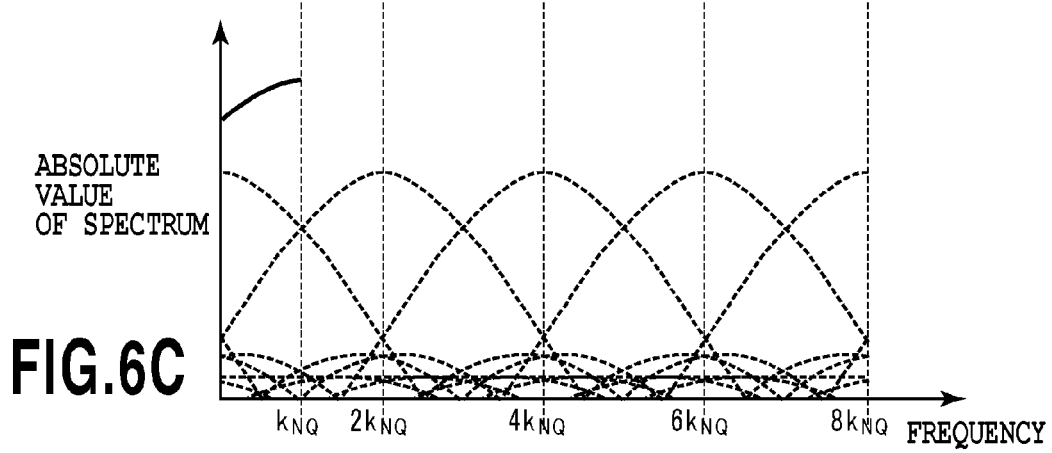

The integration of the image of the subject formed on the image capturing sensor 401 is calculated using the size of the pixel aperture 403, and sampling for the result is performed using the interval for the pixels 402 (hereinafter referred to as the pixel pitch). Therefore, the spectrum for the image of the subject, which is formed by passing the image capturing sensor 401, is one provided in a manner that the spectrum for the image of the subject originally formed on the image capturing sensor 401 is filtered using the aperture characteristic (specifically, a transfer function for the pixel aperture), and thereafter, the high frequency element thereof is folded. This aperture characteristic is the Fourier transform for the aperture function that represents the transmittance of the pixel aperture. This aspect is shown in FIGS. 6A to 6C. In FIGS. 6A to 6C, the vertical axis represents the absolute value of a spectrum and the horizontal axis represents a frequency, with a Nyquist frequency $k_{NQ}$ and even-numbered Nyquist positions being indicated by broken lines. The absolute value of the spectrum shown in FIG. 6A is a value obtained for the image of the subject that is originally formed on the image capturing sensor 401. It should be noted that generally there is a resolution limit for the optical system for forming an image on the image capturing sensor, and that there is no frequency element at a specific level or higher. The absolute value of the spectrum in FIG. 6B is for the image of the subject obtained by filtering the spectrum in FIG. 6A using the aperture characteristic. Due to an aperture characteristic, part of the frequency is greatly attenuated, and the absolute value for the spectrum is substantially zero. When sampling is performed for this spectrum, the spectrum shown in FIG. 6B is repeated, as indicated by the dashed lines in FIG. 6C, at intervals of twice the Nyquist frequency. When the spectra of repeated patterns are added together, the resultant spectrum is the spectrum for an image obtained by each of the image capturing units. In FIG. 6C, the spectrum obtained by each image capturing unit is indicated by the solid line.

A point to draw attention to is that when folding noise has been removed for an image by performing the super-resolution process, the spectrum in FIG. 6B is obtained, not the spectrum shown in FIG. 6A. Here, although the folding noise has been removed, an extremely attenuated frequency domain is present. The quality of the image that is obtained by removing the folding noise is considerably degraded, compared with the quality of an image for a subject that had previously been formed on the image capturing sensor.

In order to eliminate this attenuation problem, prior art is available (e.g., Japanese Patent No. 3844718) according to which not only the removal of folding noise is attempted, but also the obtaining of the original image for the subject shown in FIG. 6A is attempted by performing inverse filtering using the aperture characteristic. However, inverse filtering using the aperture characteristic is always accompanied by the amplification of noise. Of course, when signal attenuation is not high, the amplification of noise is not an especially great problem, but when the condition becomes one wherein the affect of the aperture characteristic is extremely strong and the original signal is greatly attenuated and the signal strength becomes lower than noise, the affect by amplification of noise is extremely strong. In such a case, a satisfactory high-resolution image for the subject can not be obtained. Since the size of the aperture for a typical image capturing sensor is about equivalent to that of the pixel pitch in order that as much light as possible can be collected, as shown in FIG. 6B, high signal attenuation occurs at a frequency twice as high as the Nyquist frequency, and a signal becomes buried in noise and is lost. Therefore, when the method for performing inverse filtering using the aperture characteristic is employed, it is especially difficult to obtain a satisfactory high-resolution image when about four or more times the number of pixels are involved.

So long as only a single aperture characteristic is employed, a signal having a specific frequency will be buried in noise, and as a matter of fact, will be lost, and therefore, an appropriate image can not be obtained by performing the super-resolution process. Furthermore, the pixel aperture characteristic can not be changed by using a method conventionally known as "pixel shifting", for example, whereby a plurality of images are captured by slightly shifting image capturing sensors. With this method, since for all the images a signal having the same frequency is lost, regardless of whether the number of images to be captured is increased, the lost signals can not be recovered.

Two methods are available for avoiding the occurrence of loss of signal due to the aperture characteristic. One method is a simple one involving an improvement of the aperture characteristic by reducing the size of the aperture until about equivalent to a pixel pitch that corresponds to a high-resolution image to be generated. With this method, however, since the pixel pitch can also be reduced, the super-resolution process need not be performed in the first place.

Figure 7A:
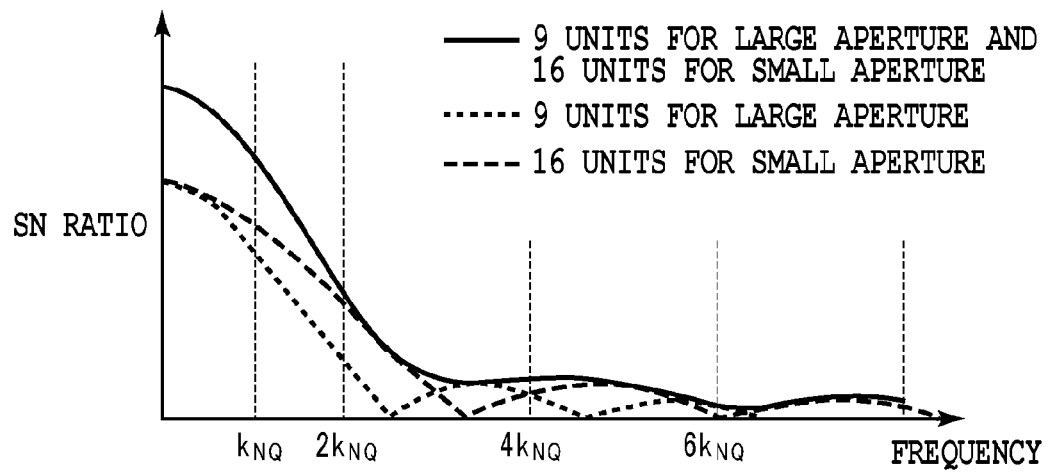
FIGS. 7A and 7B are diagrams showing example SN ratios for explaining the embodiment of the present invention, in a case wherein a plurality of apertures are employed.
Figure 7B:
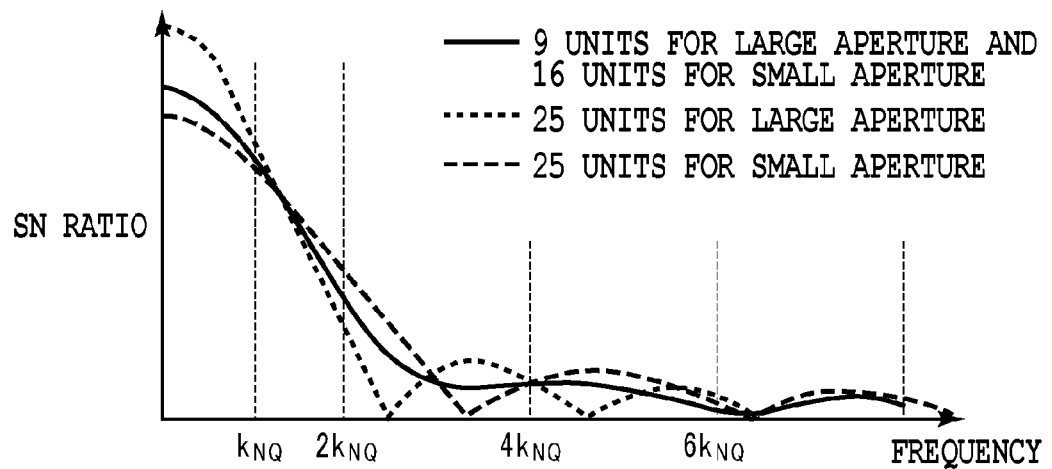

The other method is an aperture characteristic control method for changing the aperture characteristic for image data obtained by each of the image capturing units, so that a signal that is lost for specific image data will not be lost for the other image data. A simple method for controlling the aperture characteristic is changing of the aperture size by about 20 to 30 percent. As described above, since the aperture characteristic is a Fourier transform of the aperture function, when the aperture size is reduced by 20 percent, the aperture characteristic is expanded along the axis of a frequency by 20 percent. As a result, the frequency at which loss of signal occur can be changed. This method will now be explained by employing an example. For this embodiment, 25 image capturing sensors are employed, the configuration other than the image capturing sensors is identical, and the same pixel pitch is employed. The pixel shape is a square, and two types of pixel apertures are prepared. Specifically, 9 out of 25 image capturing sensors have circular pixel apertures for which the diameter measurement corresponds to that of the pixel pitch, and the 16 remaining image capturing sensors have circular pixel apertures for which the diameter is smaller by 25% than the pixel pitch. The SN ratio obtained when these image capturing sensors are employed to capture an image for a subject having a flat spectrum is shown in FIG. 7A. A dashed line and a broken line indicate SN ratios obtained for 9 image capturing units having large pixel apertures and 16 image capturing units having small pixel apertures, respectively. In both cases, where loss of signal occurred, a portion of the SN ratio dropped almost to zero, but the frequency at which portion drops occurred differs for the large and the small pixel apertures. The solid line indicates an SN ratio for an image that is obtained by synthesizing the two images, and until a frequency is reached that is about six times the Nyquist frequency $K_{NQ}$ no signal will be lost. That is, a degree of loss of signal is a predetermined level or lower for an image obtained by image synthesis. The SN ratio obtained for the above described arrangement, and for comparison, the SN ratios obtained when the same pixel aperture size is applied for 25 image capturing sensors are shown in FIG. 7B. Although the SN ratios obtained by the arrangement that employs two aperture characteristics for the sensors is lower in some frequency domains than the SN ratio obtained by the structure that employs a single aperture characteristic for all the sensors, signal loss does not occur when two aperture characteristics are employed, so that a more satisfactory image can be obtained.

When loss of signal can be prevented by using together a plurality of aperture characteristics, a more satisfactory high-resolution image can be obtained through super-resolution processing. The prevention of loss of signal is the primary object of this embodiment.

There is a method other than the method described above, for changing, for each image data set, an aperture characteristic for capturing an image of a subject. Generally, when the size or the shape of a pixel aperture is changed, the aperture characteristic is changed for an image of the subject. For example, as shown in FIG. 8A, even if the pixel pitches and the aperture shapes are identical, when the imaging magnification is changed about 20 to 30 percent for the individual image capturing units, the aperture characteristic can be changed for individual images that have been captured. It should be noted, however, that since the sampling pitches for the spectrum and the folding noise differ in the individual images, super-resolution processing becomes a little complicated in FIG. 8A case. As another example, as shown in FIG. 8B, both the imaging magnification and the aperture shape may be changed for individual image capturing units in order to change the aperture characteristic. In a case, as shown in FIG. 8C, wherein only the pixel pitch is changed while the aperture shape and the imaging magnification are unchanged, the aperture characteristic can not be changed. This is applied for rectangular pixels having unequal vertical and horizontal pixel pitches, and so long as the aperture shape remains the same, there is no change in the aperture characteristic, which is a Fourier transform of the aperture function.

Figure 9A:
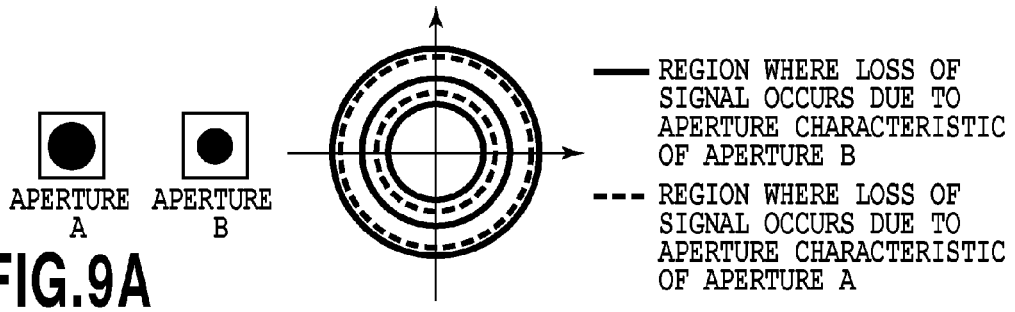
FIGS. 9A to 9D are diagrams for explaining example frequencies at which loss of signal occurs, according to the embodiment of the present invention.
Figure 9B:
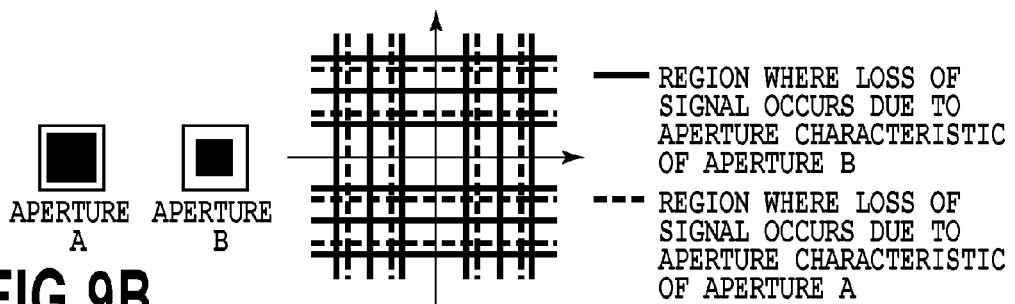
Figure 9C:
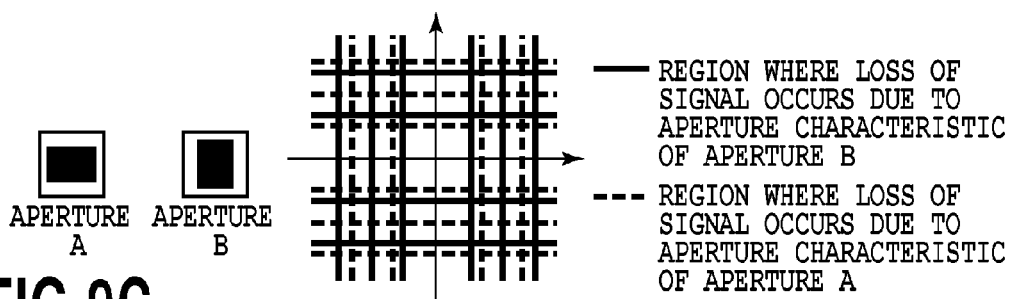
Figure 9D:
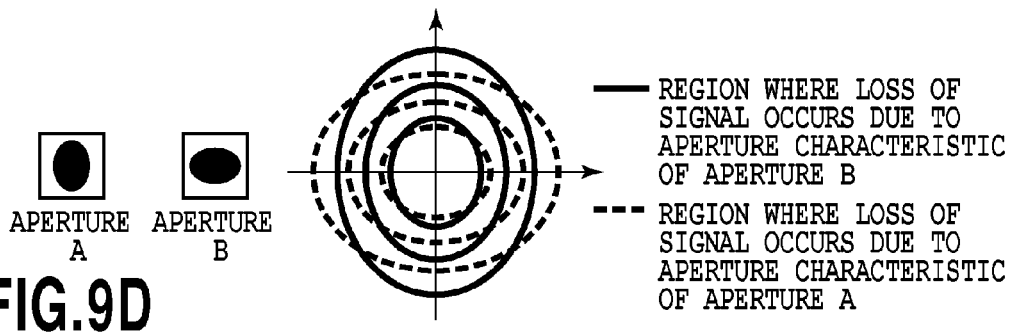
Figure 10A:
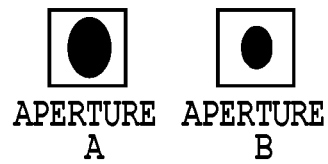
FIGS. 10A to 10E are diagrams showing example sets of apertures where loss of signal does not occur, according to the embodiment of the present invention.
Figure 10B:
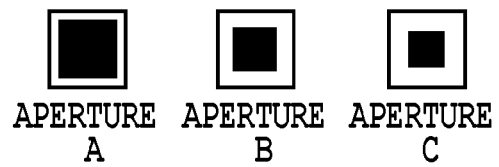
Figure 10C:
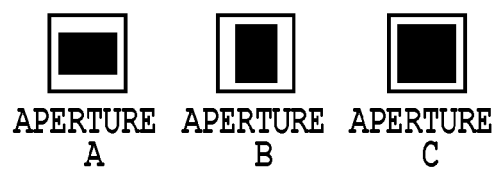
Figure 10D:
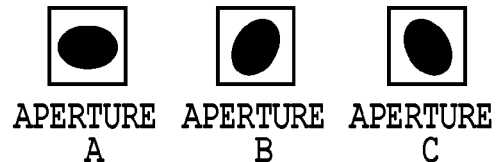
Figure 10E:
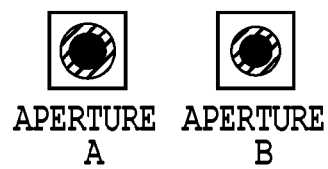

When the aperture characteristic is designed to prevent loss of signal, the fact that an image is two-dimensional should be taken into account. Referring to the examples in FIGS. 7A and 7B, to simplify the drawings, an SN ratio is shown only in a specific one-dimensional direction, and loss of signal is avoided by employing together the two types of aperture characteristics. In order to obtain a satisfactory image, however, it is more appropriate that a set of aperture characteristics be designed to avoid loss of signal for the subject, relative to all of the points on the two-dimensional plane. In a case wherein there is a circular pixel aperture, as shown in FIG. 9A, loss of signal can be prevented by employing together two types of aperture characteristics. However, in cases wherein a pixel aperture is a square aperture as in FIG. 9B, a rectangular aperture, as in FIG. 9C, or an oblong aperture, as in FIG. 9D, two aperture characteristics are insufficient, because loss of signal occurs in overlapped areas, and it is therefor preferable that three or more aperture characteristics be employed together.

FIGS. 10A to 10E are diagrams showing example sets of pixel aperture shapes that can be employed to prevent loss of signal. Assuming that for all the image capturing units the magnification employed for capturing an image of a subject is identical, other than those sets in the examples, there are countless sets of aperture shapes available to prevent loss of signal, and therefore, the present invention should not be limited to the sets in FIGS. 10A to 10E. Further, the pixel apertures need not be represented by using a two-valued state, either open or closed, and may even be apertures that permit the passage of only specified portions of available light.

Since countless numbers of sets of apertures are available, it is preferable that an optimization procedure, such as a genetic algorithm, be employed to determine which aperture shapes are to be included in a set. First, assuming that the number of image capturing units is N, and that the aperture function of the j-th image capturing unit is $a_j(x)$. In this case, x denotes a location on an image capturing sensor, and when a magnification of a subject differs among the image capturing units, x is obtained by dividing the aperture by the magnification and performing scaling. Then, optimization processing is performed to find a set of apertures such that the following evaluation value G is smaller than a predesignated target value.

$$G=\Sigma_k W(k)H(k)$$

$$H=\{\Sigma_j |A_j(k)|^2\}^{-1}$$

$$A_j(k)=F(a_j(x))$$

Here, F(X) denotes the Fourier transform of X, and k denotes a frequency. H(k) denotes a function that evaluates a degree of loss of signal for an synthesized image at a frequency k. In a case wherein a signal is lost at the frequency k, H(k) becomes a very great value. W(k) is weighting relative to the frequency, and an arbitrary value can be set for the weight W(k). For example, when suppression of loss of signal at a low frequency is more important than suppression at a high frequency, W(k) is set so as to be monotonously reduced relative to the frequency k. When suppression of a loss of a signal at a high frequency is performed prior to suppression at a low frequency, W(k) is set so as to be monotonously increased relative to the frequency k. It should be noted that the upper limit of the frequency k for the sum of the k is the Nyquist frequency of a high-resolution image.

<Processing for Synthesizing a Plurality of RAW Data Sets>

The processing for synthesizing a plurality of RAW data sets, which is included in the image generation processing performed by the digital signal processing 201, will now be described in detail. This data synthesis process is performed by controlling the field of depth, while increasing the resolution by employing the super-resolution process. First, an out-line of the synthesis process will be described. Since the individual image capturing units 101 to 125 are arranged at different locations, as shown in FIG. 1, a set of RAW data output by these units represents so-called multi-viewpoint images. Synthetic aperture method is a conventional method for controlling the depth of field, based on these multi-viewpoint images, to generate an image. There are several ways in which synthetic aperture method can be performed, but basically, multi-viewpoint images are aligned for a focusing distance, and the filtering process is performed for these images to create a synthesis image having a smaller depth of field than that of each of the multi-viewpoint images. An example method for adjusting the depth of field is a method employed for changing a filter employed for the filtering process, or a method for changing a number of images that are to be synthesized. Further, there are several different types of super-resolution processes, but for each type, basically, a plurality of images are aligned and superimposed, and filtering or a Bayesian estimation is performed. In both synthetic aperture method and the super-resolution process, images are aligned in the above described manner, and thereafter, a post-process is performed. The digital signal processing unit 201 employs both the synthetic aperture method and the super-resolution process to control the depth of field and increase the resolution.

Usually, in the captured images, subjects are actually located at various distances. For the image regions showing a subject that is located at a distance differing from a focusing distance, the positions for the subject are shifted because of parallax. During the synthesis process, image regions where the positions for the subject are comparatively aligned and the image regions where the positions are shifted are determined. As a result of the determination, the super-resolution process is performed for those image regions where the positions are comparatively aligned, whereas, the image blurring process using synthetic aperture method is performed for the image regions where the positions are not comparatively aligned. To perform the determination of the image regions, the dispersion of color signals output by different image capturing units are examined for the image regions in which the positions of the subject are aligned, then, whether the magnitude of dispersion is great or small can be employed for the determination. When the positions for the subject are appropriately aligned in the image regions that are obtained by the different image capturing units, it is assumed that these image capturing units have captured almost the same region for the subject, and the magnitude of dispersion is small. When the positions are shifted, however, the magnitude of dispersion becomes great.

The super-resolution processing that can be applied for this embodiment will now be described by employing an example. A method called Maximum A Posteriori estimation (hereinafter referred to as MAP estimation) is known as one of the super-resolution processes. The MAP estimation is one type of Bayesian estimation, and a high-resolution image that is statistically plausible can be obtained. According to the MAP estimation, an evaluation value E is defined as follows, and an image having the smallest evaluation value E is regarded as a high-resolution image.

$$E(I)=\Sigma_j \Sigma_p \{(I_{jp}-D_{jp}A_j I)^2/\sigma_{Ij}^2\}$$

where I denotes image data consisting of the same number of pixels as that of high-resolution image data to be generated. $I_{jp}$ denotes a pixel value at a pixel portion p for low-resolution image data obtained by the j-th image capturing unit (hereinafter referred to as image data j). $\sigma_{Ij}$ denotes noise included in the pixel value. $A_j$ denotes an operator of the j-th image capturing unit that is employed to filter the pixel aperture characteristic, and specifically, is an operation for convoluting, to image data I, a filter that represents the transmittance of a pixel aperture. Further, $D_{jp}$ denotes an operator that represents down-sampling, and specifically, is an operation for examining and obtaining the pixel values of high-resolution image data corresponding to the positions of the individual pixels of the low-resolution image data, which is obtained by image capturing. A positional relationship between the low-resolution image data and the high-resolution image data can be calculated by performing a well-known perspective projection transformation and an inverse transformation for the projection. That is, the inverse transformation for the perspective projection is performed, and based on a specific pixel position (xj, yj of image data j and a focusing distance z, the location of a subject on so-called world coordinates, (X, Y, Z), is obtained. The world coordinate system can be employed in common with the camera coordinate system of an image capturing unit 1 which is j=1. Next, the perspective projection transformation is performed by the image capturing unit 1, and (X, Y, Z), the location of the subject on the world coordinates, is converted into {x1 (xj, yj), y1 (xj, yj)}, the pixel location of the image data 1. The parameters required for the perspective projection transformation are included in the camera design parameters and the image capturing parameters. When there is lens distortion among the image data sets, a conventional distortion correction is performed for the individual pixel positions, and thereafter, the inverse transformation for projection and a perspective projection transformation are performed to determine the correspondence of the pixel positions. During the calculation of the evaluation value E, the summing of the pixel values p is performed for the regions wherein the positions for the subject are aligned. Through the above described process, high-resolution image data are obtained which represents an image produced by performing the inverse filtering of the effective aperture characteristic. That is, the obtained image data represent an image that corresponds to the image for a subject that is formed on the image capturing sensor before filtering of the aperture characteristic is performed. In this embodiment, as described above, since there is no loss of signal, underflows do not occur for the effective aperture characteristic. Therefore, when the inverse filtering of the effective aperture characteristic is performed, it is inevitable that noise will be more or less amplified, although the drastic deterioration of image data seldom ever occurs. Therefore, in order to suppress noise amplification, it is preferable that a weak low-pass filter be applied for the high-resolution image data obtained through the above described process.

Further, for an arrangement for which there are only a few aperture characteristics, such as the arrangement previously provided as an example that includes nine image capturing units having large apertures and 16 image capturing units having small apertures, super-resolution processing other than the above described processing may also be performed. First, the conventional super-resolution processing (e.g., the process presented in Japanese Patent No. 3773563) is performed for the individual sets of image data obtained by the 9 image capturing units and those obtained by the 16 image capturing units, respectively, and folding noise is removed from the resultant data, so that two types of high-resolution image data, Ig and $I_{16}$, are obtained. The high-resolution image data have a large number of pixels, while loss of signal has occurred at a specific frequency due the aperture characteristic. These two sets of image data are synthesized by the following equations, and high-resolution image data I is obtained.

$$S_j = F(I_j)$$

$$A_j = F(a_j)$$

$$S_R = [\Sigma_j \{2Re\ (A_j S_j^*)/|\sigma_j|^2\}]/[\Sigma_j \{|A_j|2/|\sigma_j|^2\}]$$

$$S_I = [\Sigma_j \{2Im\ (A_j S_j^*)/|\sigma_j|^2\}]/[\Sigma_j \{|A_j|2/|\sigma_j|^2\}]$$

$$S = S_R + i S_I$$

$$I = F^{-1}(S)$$

In this case, $F^{-1}(X)$ represents the Fourier inverse transform of X, and j is an index for designating the type of aperture characteristic. $\sigma_j$ denotes noise carried by a spectrum $S_j$ and $a_j$ denotes the j-th aperture function, and * denotes a complex conjugate. Furthermore, since the high-resolution image data I also represents an image obtained by the inverse filtering of the effective aperture characteristic, it is preferable that a weak low-pass filter be applied to suppress the amplification of noise.

As described above, according to this embodiment, since a plurality of pixel aperture characteristics are employed, loss of signal is suppressed at a frequency higher than the Nyquist frequency, and more satisfactory high-resolution image data can be obtained.

<Other Embodiments>

The processing performed by the image capturing apparatus has been described. However, the above described processes may be performed by another image processing apparatus, such as a personal computer (a PC). In this case, when the digital signal processing unit 201, the image generation parameter obtaining unit 212 and the CG generating unit 205, for example, are included in the PC, and A set of RAW data and various types of parameters are transmitted from an external medium to the PC, the above described processing can be performed.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-119945, filed May 30, 2011, which is hereby incorporated by reference herein in its entirety.

What is claimed is:

1. An image processing apparatus comprising:
an input unit configured to input a plurality of digital image data obtained by a plurality of image capturing units, each image capturing unit comprising a lens and an image capturing sensor comprising a plurality of pixels, each pixel comprising a pixel aperture, wherein a pixel aperture characteristic of the pixel apertures of the pixels of at least one of the image capturing units differs from a pixel aperture characteristic of the pixel apertures of the pixels of the other image capturing units and the plurality of digital image data represent images of a same subject captured from a plurality of viewpoints; and
a generation unit configured to synthesize the plurality of digital image data input by the input unit to generate developed image data, wherein the developed image data represents an image consisting of a greater number of pixels than each image represented by the digital image data obtained by the each image capturing unit,
wherein each of the pixel apertures is smaller in size than a pixel of the plurality of pixels that comprises the pixel aperture, and the pixel aperture characteristics indicate at the least one of a pixel aperture size, a pixel aperture shape, or an imaging magnification of a subject, and
wherein the pixel aperture characteristics are determined for the individual image capturing units such that the lowest frequency at which loss of signal of the synthesized image occurs is higher than the lowest frequency at which loss of signals of the images captured by the image capturing units occurs.

2. The image processing apparatus according to claim 1, wherein the input unit is configured to input a plurality of digital image data obtained by the plurality of image capturing units capturing a same subject at the almost the same time, wherein the pixel aperture characteristic provided for at least some of the image capturing units differs from the pixel aperture characteristic provided for the other image capturing units.

3. The image processing apparatus according to claim 1, wherein the pixel aperture characteristics are determined for the individual image capturing units such that a degree of loss of signal for the synthesized image is lower than a predetermined degree.

4. The image processing apparatus according to claim 1, wherein a pixel count for a developed image generated by the generation unit is more than four times a pixel count for digital images obtained by the each image capturing unit.

5. An image processing apparatus according to claim 1, further comprising an obtaining unit configured to obtain design parameters including the pixel aperture characteristics for the plurality of image capturing units, wherein the generation unit uses the obtained design parameters to generate the developed image data.

6. The image processing apparatus according to claim 5, wherein the obtaining unit obtains design parameters including the pixel aperture characteristics for the plurality of image capturing units and image capturing parameters of the plurality of image capturing units at the image capturing time; and
wherein the generation unit synthesizes the plurality of digital image data input by the input unit using the obtained designed parameters and the obtained image capturing parameters to generate developed image data, wherein the developed image data represents an image consisting of a greater number of pixels than each image represented by the digital image data obtained by the each image capturing unit.

7. The image processing apparatus according to claim 1, wherein each of the plurality of image capturing units comprises a different lens and a different image capturing sensor, and each of the images represented by the plurality of digital image data is captured by the different lenses.

8. The image processing apparatus according to claim 1, wherein the pixel aperture characteristics indicate imaging magnification of each of the images represented by the plurality of digital image data.

9. The image processing apparatus according to claim 1, wherein the pixel aperture characteristics are determined for the individual image capturing units such that an evaluation value G becomes smaller than a predetermined value, wherein the evaluation value G is represented by the equation:

$$G=\Sigma_k W(k)H(k), \text{ where}$$

$$H=\{\Sigma_j |A_j(k)|^2\}^{-1}, \text{ and}$$

$$A_j(k)=F(a_j(x)),$$

wherein $F(a_j(x))$ denotes a Fourier transform of an aperture function of j-th image capturing unit $a_j(x)$, k denotes a frequency and W(k) denotes weighting relative to the frequency k.

10. An image processing method comprising:
an input step of inputting a plurality of digital image data obtained by a plurality of image capturing units, each image capturing unit comprising a lens and an image capturing sensor comprising a plurality of pixels, each pixel comprising a pixel aperture, wherein a pixel aperture characteristic of the pixel apertures of the pixels of at least one of the image capturing units differs from a pixel aperture characteristic of the pixel apertures of the pixels of the other image capturing units and the plurality of digital image data represent images of a same subject captured from a plurality of viewpoints; and
a generation step of synthesizing the plurality of digital image data input at the input step to generate developed image data, wherein the developed image data represents an image consisting of a greater number of pixels than each image represented by the digital image data obtained by the each image capturing unit,
wherein each of the pixel apertures is smaller in size than a pixel of the plurality of pixels that comprise the pixel aperture, and the pixel aperture characteristics indicate at the least one of a pixel aperture size, a pixel aperture shape or an imaging magnification of a subject, and
wherein the pixel aperture characteristics are determined for the individual image capturing units such that the lowest frequency at which loss of signal of the synthesized image occurs is higher than the lowest frequency at which loss of signal of the images captured by the image capturing units occurs.

11. A non-transitory computer-readable storage medium storing a program for causing a computer to function as the image processing apparatus according to claim 1.

12. An image capturing apparatus comprising a plurality of image capturing units capable of capturing a plurality of image data representing images of a same subject captured from a plurality of viewpoints, each image capturing unit comprising a lens and an image capturing sensor comprising a plurality of pixels, each pixel comprising a pixel aperture,
wherein a pixel aperture characteristic of the pixel apertures of the pixels of at least one of the image capturing units differs from a pixel aperture characteristic of the pixel apertures of the pixels of the other image capturing units, each of the pixel apertures is smaller in size than a pixel of the plurality of pixels that comprise the pixel aperture, and the pixel aperture characteristics indicate at the least one of a pixel aperture size, a pixel aperture shape or an imaging magnification of a subject, and
wherein the pixel aperture characteristics are determined for the individual image capturing units such that the lowest frequency at which loss of signal of the synthesized image occurs is higher than the lowest frequency at which loss of signal of the images captured by the image capturing units occurs.

* * * * *